United States Patent
Aoki et al.

(10) Patent No.: US 9,365,087 B2
(45) Date of Patent: Jun. 14, 2016

(54) AMPHIBIOUS VEHICLE

(71) Applicant: MITSUBISHI HEAVY INDUSTRIES, LTD., Tokyo (JP)

(72) Inventors: Yasumichi Aoki, Tokyo (JP); Shinichi Sato, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 14/424,373

(22) PCT Filed: Nov. 18, 2013

(86) PCT No.: PCT/JP2013/080984
§ 371 (c)(1),
(2) Date: Feb. 26, 2015

(87) PCT Pub. No.: WO2014/084074
PCT Pub. Date: Jun. 5, 2014

(65) Prior Publication Data
US 2015/0258867 A1    Sep. 17, 2015

(30) Foreign Application Priority Data
Nov. 30, 2012   (JP) .................. 2012-263217

(51) Int. Cl.
*B60F 3/00* (2006.01)
*B60K 17/04* (2006.01)
*B63H 23/06* (2006.01)

(52) U.S. Cl.
CPC ............... *B60F 3/0007* (2013.01); *B60K 17/04* (2013.01); *B63H 23/06* (2013.01)

(58) Field of Classification Search
CPC .......... B60F 3/00; B60F 3/0007; B63H 23/30
USPC ....................... 440/12.5, 12.51, 75
See application file for complete search history.

(56) References Cited

U.S. PATENT DOCUMENTS

2006/0172627 A1    8/2006   Gibbs et al.
2006/0183384 A1    8/2006   Longdill et al.
(Continued)

FOREIGN PATENT DOCUMENTS

JP    2008-516847 A    5/2008
JP    2008-517818 A    5/2008
(Continued)

OTHER PUBLICATIONS

International Preliminary Report on Patentability and English translation of the Written Opinion of the International Searching Authority (Forms PCT/IB/338, PCT/IB/373, and PCT/ISA/237) dated Jun. 11, 2015, for International Application No. PCT/JP2013/080984.
(Continued)

*Primary Examiner* — Stephen Avila
(74) *Attorney, Agent, or Firm* — Birch, Stewart, Kolasch & Birch, LLP

(57) ABSTRACT

An amphibious vehicle is provided with: a drive source (1) that produces power; a drive device for land travel (4a, 4b) that is driven by the power produced by the power source; a propulsion device for water travel (6a, 6b) that is driven by the power produced by the power source; and a power allocation device (2) that allocates the power produced by the power source between the drive device for land travel and the propulsion device for water travel. When moving from water to land, both the drive device for land travel and the propulsion device for water travel are operated. The amphibious vehicle is further provided with a first transmission (3) between the power allocation device and the drive device for land travel, and a second transmission (5a, 5b) between the power allocation device and the propulsion device for water travel separately from the first transmission.

2 Claims, 2 Drawing Sheets

(56) References Cited

U.S. PATENT DOCUMENTS

| | | |
|---|---|---|
| 2006/0189224 A1 | 8/2006 | Longdill et al. |
| 2006/0199449 A1* | 9/2006 | Longdill et al. ............ 440/12.5 |
| 2008/0139060 A1 | 6/2008 | Gibbs et al. |
| 2008/0176464 A1 | 7/2008 | Longdill et al. |
| 2009/0004932 A1* | 1/2009 | Jeffery et al. ............ 440/12.51 |
| 2012/0108118 A1 | 5/2012 | Longdill et al. |

FOREIGN PATENT DOCUMENTS

| | | | |
|---|---|---|---|
| JP | 2008-524043 A | | 7/2008 |
| JP | 2008-525265 A | | 7/2008 |
| JP | 2009-67121 A | | 4/2009 |
| JP | 2010-269764 | * | 12/2010 |
| JP | 4712808 B2 | | 6/2011 |
| JP | 4712809 B2 | | 6/2011 |
| JP | 4712810 B2 | | 6/2011 |
| JP | 4712815 B2 | | 6/2011 |
| JP | 2012-171363 | * | 9/2012 |

OTHER PUBLICATIONS

International Search Report and Written Opinion of the International Searching Authority (Forms PCT/ISA/210, PCT/ISA/220 and PCT/ISA/237) dated Feb. 10, 2014, for International Application No. PCT/JP2013/080984 with an English translation of the International Search Report.

* cited by examiner

AMPHIBIOUS VEHICLE

TECHNICAL FIELD

The present invention relates to an amphibious vehicle.

BACKGROUND ART

An amphibious vehicle capable of traveling on water and land is used as a tour vehicle, a water rescue vehicle, a disaster response vehicle, and the like. Generally, the amphibious vehicle includes a propulsion device such as a propeller or a water jet for travel on water and a drive device such as wheels and tracks for travel on land, for one power source such as an engine or a motor. Furthermore, the amphibious vehicle includes a power distribution device for distributing the power from the power source to the propulsion device for travel on water and the drive device for travel on land.

The amphibious vehicle can travel on land and water by controlling the power distribution device to use one or both of the drive device and the propulsion device depending on a situation. The amphibious vehicle travels on land by activating the drive device. After transition from land to water, the amphibious vehicle stops the drive device and travels on water by activating the propulsion device. In transition from water to land, the amphibious vehicle activates the drive device in addition to the propulsion device activated for travel on water (Patent Document 1).

Such control of the power distribution device can be divided into three modes of a land travel mode, a water travel mode, and a landing mode based on a movement state of the amphibious vehicle. The land travel mode is control performed when the amphibious vehicle is traveling on land, and sets the amphibious vehicle to a state where the propulsion device is stopped and only the drive device is activated. The water travel mode is control performed when the amphibious vehicle is traveling on water, and sets the amphibious vehicle to a state where the drive device is stopped and only the propulsion device is activated. The landing mode is control performed when the amphibious vehicle performs the transition from water to land, and sets the amphibious vehicle to a state where the drive device and the propulsion device are activated.

In the control described above, the drive device is activated in the land travel mode and the landing mode. In the land travel mode, the drive device is used in a wide range up to a point where the engine rotates at high speed, i.e. used in a wide range up to a point where the amphibious vehicle travels at high speed. Meanwhile, in the landing mode, the drive device is used only in a narrow range where the engine rotates at low speed, i.e. used only in a narrow range where the amphibious vehicle travels at low speed.

The drive device of the amphibious vehicle is thus formed of a mechanism suitable for the land travel mode whose usage range is wide. Specifically, the drive device of the amphibious vehicle is set such that the vehicle speed of the amphibious vehicle and the engine torque required to activate the drive device with respect to the engine speed are appropriate in the land travel mode.

Moreover, the propulsion device is activated in the water travel mode and the landing mode. In the water travel mode, the propulsion device is used in a wide range up to a point where the engine rotates at speed, i.e. used in a wide range up to a point where the amphibious vehicle is travels at high speed. Meanwhile, in the landing mode, the propulsion device is used only in a narrow range where the engine rotates at low speed, i.e. used only in a narrow range where the amphibious vehicle travels at low speed.

The propulsion device of the amphibious vehicle is thus formed of a mechanism suitable for the water travel mode whose usage range is wide. Specifically, the propulsion device of the amphibious vehicle is set such that the vehicle speed of the amphibious vehicle and the engine torque required to activate the propulsion device with respect to the engine speed are appropriate in the water travel mode.

Since the drive device is set to be suitable for the land travel mode and the propulsion device is set to be suitable for the water travel mode as described above, the engine speed and the engine torque are in an appropriate state in the land travel mode in which only the drive device is activated and in the water travel mode in which only the propulsion device is activated.

PRIOR ART DOCUMENT

Patent Document

Patent Document 1: Japanese Patent Application Publication No. 2010-269764

SUMMARY OF THE INVENTION

Problems to be Solved by the Invention

However, in the landing mode of the amphibious vehicle, the drive device which is a mechanism suitable for the land travel mode and the propulsion device which is a mechanism suitable for the water travel mode are used. Specifically, in the landing mode, the amphibious vehicle requires engine torque equal to that obtained by adding up engine torque required to activate the drive device in the land travel mode and engine torque required to activate the propulsion device in the water travel mode.

Since it is only necessary for the amphibious vehicle to surely and safely perform landing, there is no need to activate the drive device and the propulsion device to such a degree that the amphibious vehicle accelerates. In the landing mode of the amphibious vehicle, it is only necessary to activate the drive device to such a degree that the amphibious vehicle can travel at a low speed and to activate the propulsion device to such a degree that the posture of the amphibious vehicle can be controlled. In other words, the added-up engine torque described above is excessive in the landing of the amphibious vehicle. Such required extra engine output may lead to increase in the size of the engine.

The present invention has been made in view of the problems described above, and an object thereof is to reduce engine torque required in landing of an amphibious vehicle and required output of an engine and prevent increase in the size of the engine.

Means for Solving the Problems

An amphibious vehicle of a first aspect of the invention for solving the problems described above includes: a drive source configured to produce power; a drive device for travel on land configured to be driven by the power produced in the power source; a propulsion device for travel on water configured to be driven by the power produced in the power source; and a power distribution device configured to distribute the power produced by the power source to the drive device for travel on land and the propulsion device for travel on water, the amphibious vehicle configured to activate both of the drive device for travel on land and the propulsion device for travel on water in transition from water to land, the amphibious vehicle comprises: a first transmission between the power distribution device and the drive device for travel on land; and a second transmission between the power distribution device and the propulsion device for travel on water, the second transmission being different from the first transmission.

An amphibious vehicle of a second aspect of the invention for solving the problems described above is the amphibious vehicle of the first aspect of the invention, wherein each of the first and second transmissions has a gear ratio dedicated to landing which is used in the landing.

An amphibious vehicle of a third aspect of the invention for solving the problems described above is the amphibious vehicle of the first aspect of the invention, wherein each of the first and second transmissions has a clutch function.

Effect of the Invention

Since the amphibious vehicle of the first aspect of the invention comprises: the first transmission between the power distribution device and the drive device for travel on land; and the second transmission between the power distribution device and the propulsion device for travel on water and can thereby change the gear ratios of the drive device for travel on land and the propulsion device for travel on water, torque required to activate the drive device for travel on land and the propulsion device for travel on water can be reduced. Accordingly, it is possible to reduce the required output of the power source and prevent increase in the size of the power source.

In the amphibious vehicle of the second aspect of the invention, each of the first transmission corresponding to the drive device for travel on land and the second transmission corresponding to the propulsion device for travel on water is provided with the gear ratio dedicated to landing. Due to this, it is possible to further reduce the torque required to activate the drive device for travel on land and the propulsion device for travel on water in landing and further reduce the required output of the power source in landing.

In the amphibious vehicle of the third aspect of the invention each of the first transmission corresponding to the drive device for travel on land and the second transmission corresponding to the propulsion device for travel on water has the clutch function. Due to this, the drive device for travel on land and the propulsion device for travel on water can be stopped irrespective of control of the power distribution device. Specifically, the drive device for travel on land can be stopped by the clutch function even when the amphibious vehicle is controlled in a land travel mode or a landing mode, and the propulsion device for travel on water can be stopped by the clutch function even when the amphibious vehicle is controlled in a water travel mode or the landing mode.

MODE FOR CARRYING OUT THE INVENTION

An embodiment of an amphibious vehicle of the present invention is described below in detail with reference to the attached drawings. As a matter of course, the present invention is not limited to the embodiment described below and various modifications can be made within a scope not departing from the spirit of the present invention.

Embodiment 1

First, the structure of the amphibious vehicle in Embodiment 1 of the present invention is described with reference to FIGS. 1 and 2.

Figure 1:
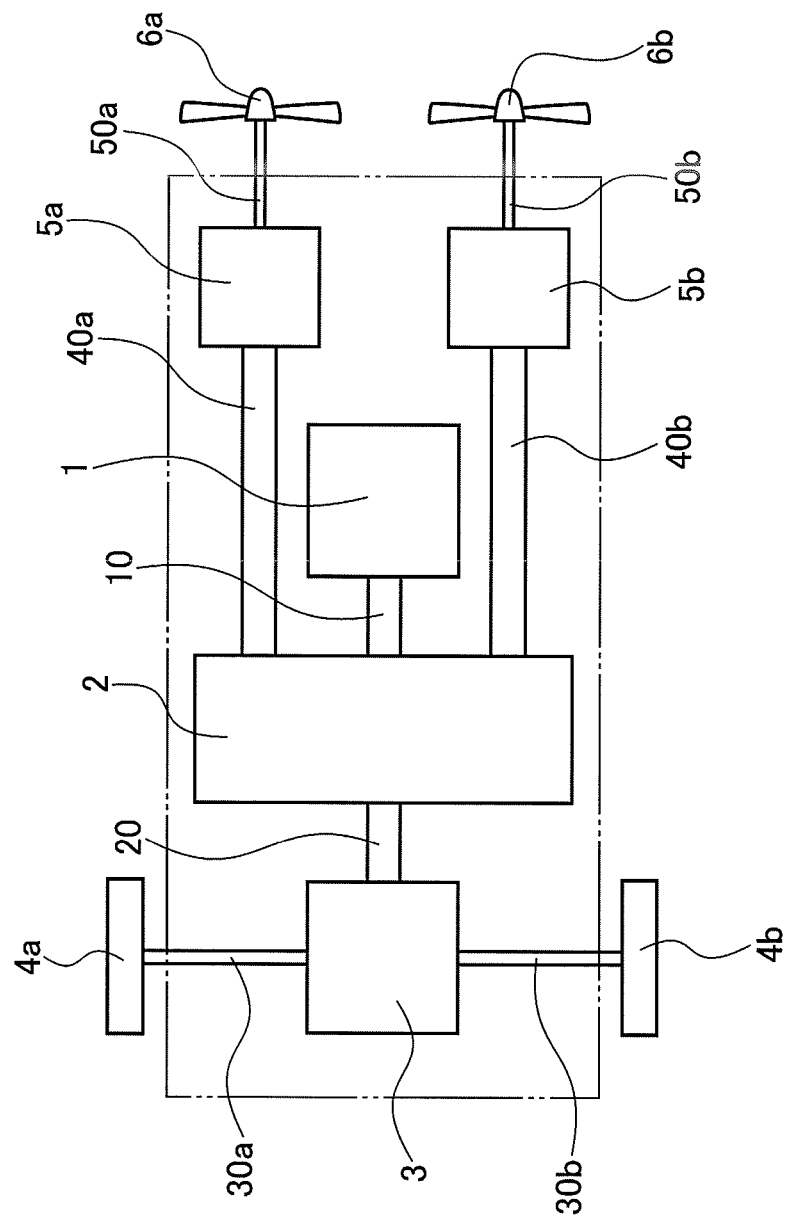
FIG. 1 is an explanatory view showing a power transmission part in an amphibious vehicle of Embodiment 1.

As shown in FIG. 1, a power transmission part in the amphibious vehicle of the embodiment includes an engine 1 which is a power source, a power distribution device 2 which distributes power produced in the engine 1, a wheel transmission 3 and wheels 4a, 4b which are used for travel on land, and propeller transmissions 5a, 5b and propellers 6a, 6b which are used for travel on water.

The power distribution device 2 is connected to the engine 1 via a power transmission shaft 10. The wheel transmission 3 by which wheel shafts 30a, 33b are rotatably supported is connected to the power distribution device 2 via a first power distribution shaft 20, the wheel shafts 30a, 30b being provided with the wheels 4a, 4b at front ends. Furthermore, the propeller transmissions 5a, 5b by which propeller shafts 50a, 50b are rotatably supported are connected to the power distribution device 2 via second power distribution shafts 40a, 40b, the propeller shafts 50a, 50b being provided with the propellers 6a, 6b at front ends.

The power produced in the engine 1 is transmitted to the power distribution device 2 via the power transmission shaft 10 and is dividedly transmitted to the first power distribution shaft 20 and the second power distribution shafts 40a, 40b in the power distribution device 2. The power transmitted to the first power distribution shaft 20 rotates the wheel shafts 30a, 30b and the wheels 4a, 4b via the wheel transmission 3 and enables the amphibious vehicle to travel on land. The power transmitted to the second power distribution shafts 40a, 40b rotates the propeller shafts 50a, 50b and the propellers 6a, 6b via the propeller transmissions 5a, 5b and enables the amphibious vehicle to travel on water.

The power distribution device 2 has a not-illustrated first clutch function corresponding to the first power distribution shaft 20 and a not-illustrated second clutch function corresponding to the second power distribution shafts 40a, 40b. The power transmission from the engine 1 to the wheel transmission 3 can be cut by activating the first clutch function, and the power transmission from the engine 1 to the propeller transmissions 5a, 5b can be cut by activating the second clutch function. Furthermore, the amphibious vehicle includes a not-illustrated control device, and the control device controls the activation of the not-illustrated first clutch function and second clutch function in the power distribution device 2.

In the amphibious vehicle of the embodiment, a control mode of the not-illustrated control device includes three types of modes of a land travel mode in which the amphibious vehicle travels on land, a water travel mode in which the amphibious vehicle travels on water, and a landing mode in which the amphibious vehicle performs transition from water to land. Note that, the amphibious vehicle of the embodiment includes a not-illustrated mode-switching switch, and a driver of the amphibious vehicle can switch the control mode of the not-illustrated control device in the amphibious vehicle by manually operating the mode-switching switch. Alternatively, there may be employed a method in which the mode switching is automatically performed through control. The not-illustrated control device controls the power distribution device 2 in such a way that the power distribution device 2 corresponds to one of the land travel mode, the water travel mode, and the landing mode to which the control mode is switched by the driver or the automatic control.

The control of the power distribution device 2 in each of the control modes of the not-illustrated control device is as follows. In the land travel mode, the not-illustrated second clutch function is activated to cut the power transmission from the engine 1 to the propeller transmissions 5a, 5b, and the power is transmitted only from the engine 1 to the wheel transmission 3. In the water travel mode, the not-illustrated first transmission function is activated to cut the power transmission from the engine 1 to the wheel transmission 3, and the power is transmitted only from the engine 1 to the propeller transmissions 5a, 5b. In the landing mode, the power is transmitted from the engine 1 to the wheel transmission 3 and the propeller transmissions 5a, 5b.

The wheel transmission 3 is a transmission having a clutch function and is a transmission in which multiple transmission gears are combined stepwise from a low-speed gear used when the amphibious vehicle starts moving on land. In the land travel mode, it is possible to control torque required to rotate the wheels 4a, 4b and reduce load on the engine 1 by shifting the wheel transmission 3 from one of the not-illustrated gears to another according to the vehicle speed of the amphibious vehicle. Moreover, in the landing mode, it is possible to control the torque required to rotate the wheels 4a, 4b and reduce the load on the engine 1 by using the not-illustrated low-speed gear.

Figure 2:
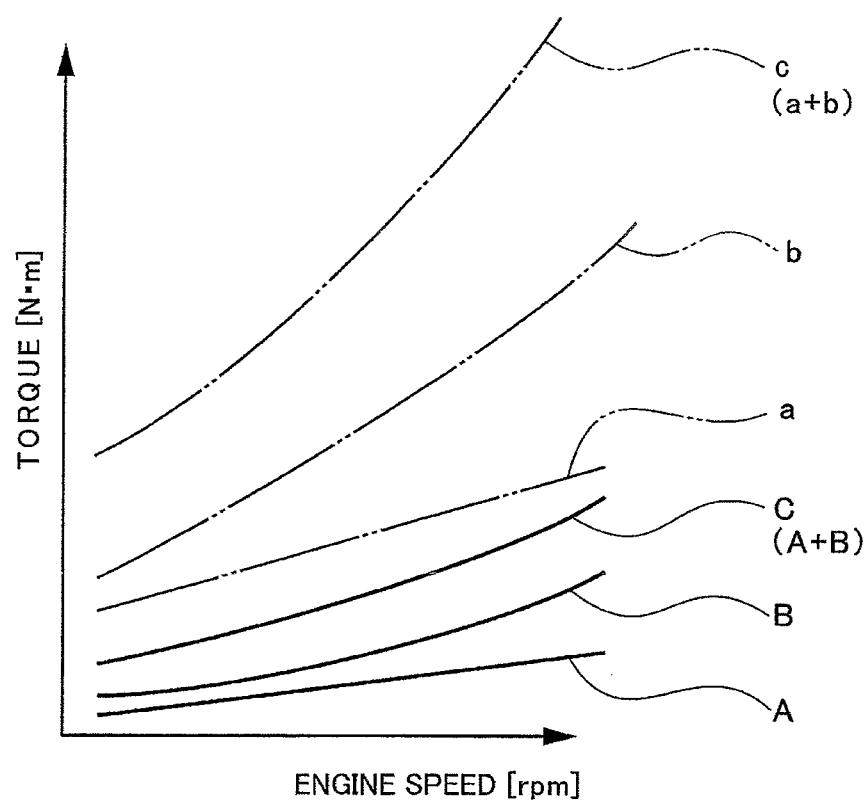
FIG. 2 is a graph showing relationships between engine speed and required engine torque in the amphibious vehicle of Embodiment 1.

FIG. 2 is a graph showing relationships between the torque and the engine speed in the aforementioned three types of control modes of a conventional amphibious vehicle including no wheel transmission 3 or propeller transmissions 5a, 5b and those of the amphibious vehicle of the embodiment.

A two-dot dash line a in FIG. 2 shows a relationship between the torque and the engine speed in the land travel mode of the conventional amphibious vehicle. A two-dot dash line b in FIG. 2 shows a relationship between the torque and the engine speed in the water travel mode of the conventional amphibious vehicle. A two-dot dash line c in FIG. 2 shows a relationship between the torque and the engine speed in the landing mode of the conventional amphibious vehicle.

A solid line A in FIG. 2 shows a relationship between the torque and the engine speed in the land travel mode of the amphibious vehicle of the embodiment. A solid line B in FIG. 2 shows a relationship between the torque and the engine speed in the water travel mode of the amphibious vehicle of the embodiment. A solid line C in FIG. 2 shows a relationship between the torque and the engine speed in the landing mode of the amphibious vehicle of the embodiment.

As shown in FIG. 2, the torque (solid line A in FIG. 2) required to rotate the wheels 4a, 4b in the amphibious vehicle including the wheel transmission 3 as in the embodiment is smaller than the torque (two-dot dash line a in FIG. 2) required to rotate the wheels in the conventional amphibious vehicle.

The wheel transmission 3 has the not-illustrated clutch function, and due to this, even when the power is transmitted from the engine 1 to the wheel transmission 3 via the power distribution device 2 in the land travel mode or the landing mode, the power transmission to the wheels 4a, 4b can be cut by activating the clutch function of the wheel transmission 3.

Each of the propeller transmissions 5a, 5b is a transmission having a not-illustrated clutch function and is a transmission in which multiple transmission gears are combined stepwise from a low-speed gear used when the amphibious vehicle starts moving on water. In the water travel mode, it is possible to control torque required to rotate the propellers 6a, 6b and reduce the load on the engine 1 by shifting each of the propeller transmissions 5a, 5b from one of the not-illustrated gears to another according to the vehicle speed of the amphibious vehicle. Moreover, in the landing mode, the torque required to rotate the propellers 6a, 6b and the load on the engine 1 can be reduced by using the not-illustrated low-speed gear.

As shown in FIG. 2, the torque (solid line B in FIG. 2) required to rotate the propellers 6a, 6b in the amphibious vehicle including the propeller transmissions 5a, 5b as in the embodiment is smaller than the torque (two-dot dash line b in FIG. 2) required to rotate the propellers in the conventional amphibious vehicle.

The propeller transmissions 5a, 5b each have the not-illustrated clutch function, and due to this, even when the power is transmitted from the engine 1 to the propeller transmissions 5a, 5b via the power distribution device 2 in the water travel mode or the landing mode, the power transmission to the propellers 6a, 6b can be cut by activating the clutch function of the propeller transmissions 5a, 5b.

As a matter of course, the structures of the wheel transmission 3 and the propeller transmissions 5a, 5b are not limited to those in the embodiment. For example, the transmissions may be continuously variable transmissions in which a gear ratio is continuously changed by a mechanism other than gears. Moreover, a very-low-speed gear dedicated to landing may be combined in addition to the not-illustrated low-speed gear of the wheel transmission 3 used when the vehicle starts moving on land and the not-illustrated low-speed gears of the propeller transmissions 5a, 5b used when the vehicle starts moving on water. This can further reduce the load on the engine 1 and the torque required to rotate the wheels 4a, 4b and the propellers 6a, 6b in landing.

Moreover, it is preferable that the wheel transmission 3 and the propeller transmissions 5a, 5b have waterproof structures to make the power transmission part waterproof in travel on water. For example, fluid clutches each configured to perform power transmission of input and output in a closed container filled with oil are used as not-illustrated clutch mechanisms in the wheel transmission 3 and the propeller transmissions 5a, 5b.

Moreover, in the embodiment, the wheels 4a, 4b are used as a drive device for travel on land and the propellers 6a, 6b are used as a propulsion device for travel on water. However, the drive device and the propulsion device in the amphibious vehicle of the present invention are not limited to these. For example, the drive device may be a track system in which a track is rotated via a drive wheel, and the propulsion device may be a screw or a water jet.

Next, operations of the amphibious vehicle in Embodiment 1 of the present invention are described with reference to FIGS. 1 and 2.

The amphibious vehicle is controlled in the land travel mode while traveling on land and is set to a state where the power transmission from the engine 1 to the propeller transmissions 5a, 5b is cut and the power is transmitted only from the engine 1 to the wheel transmission 3. In other words, the amphibious vehicle travels on land with only the wheels 4a, 4b being rotated and with the propellers 6a, 6b being stopped. Note that, in the land travel, the load on the engine 1 and the torque (solid line A in FIG. 2) required to rotate the wheels 4a, 4b is reduced by shifting the wheel transmission 3 from one of the not-illustrated gears to another according to the vehicle speed of the amphibious vehicle.

When the amphibious vehicle performs transition from land to water, the driver of the amphibious vehicle manually operates the not-illustrated mode-switching switch to switch the control mode of the amphibious vehicle from the land travel mode to the water travel mode. The switching of the mode is not limited to that performed by the manual operation and may be performed by automatic control.

The amphibious vehicle is controlled in the water travel mode while traveling on water and is set to a state where the power transmission from the engine 1 to the wheel transmission 3 is cut and the power is transmitted only from the engine 1 to the propeller transmissions 5a, 5b. In other words, the amphibious vehicle travels on water with only the propellers 6a, 6b being rotated and with the wheels 4a, 4b being stopped. Note that, in the water travel, the torque (solid line B in FIG. 2) required to rotate the propellers 6a, 6b is controlled and the load on the engine 1 is reduced by shifting each of the propeller transmissions 5a, 5b from one of the not-illustrated gears to another according to the vehicle speed of the amphibious vehicle.

In the transition from water to land, the driver of the amphibious vehicle manually operates the not-illustrated mode-switching switch to switch the control mode of the amphibious vehicle from the water travel mode to the land travel mode. The switching of the mode is not limited to that performed by the manual operation and may be performed by automatic control.

The amphibious vehicle is controlled in the landing mode while landing and is set to a state where the power is transmitted from the engine 1 to the propeller transmissions 5a, 5b and the wheel transmission 3. In other words, the amphibious vehicle lands with the propellers 6a, 6b and the wheels 4a, 4b being rotated together. Note that, in the landing, the torque (solid line B in FIG. 2) required to rotate the propellers 6a, 6b and the torque (solid line A in FIG. 2) required to rotate the wheels 4a, 4b are controlled by using the not-illustrated low-speed gear of the wheel transmission 3 and the not-illustrated low-speed gears of the propeller transmissions 5a, 5b.

In the landing mode, the propellers 6a, 6b and the wheels 4a, 4b are rotated together. Accordingly, the torque (solid line C in FIG. 2) required in the landing mode is calculated from the sum of the aforementioned torque (solid line B in FIG. 2) required to rotate the propellers 6a, 6b and the aforementioned torque (solid line A in FIG. 2) required to rotate the wheels 4a, 4b.

As shown in FIG. 2, the torque (solid line C in FIG. 2) required in the landing mode of the amphibious vehicle including the propeller transmissions 5a, 5b and the wheel transmission 3 as in the embodiment is far smaller than the torque (two-dot dash line c in FIG. 2) required in the landing mode of the conventional amphibious vehicle. In other words, the load on the engine 1 in the landing of the amphibious vehicle of the embodiment is very small.

When the amphibious vehicle completes landing and travels on land again, the driver of the amphibious vehicle manually operates the not-illustrated mode-switching switch to switch the control mode of the amphibious vehicle from the landing mode to the land travel mode. The switching of the mode is not limited to that performed by the manual operation and may be performed by automatic control. The land travel is performed as described above.

In the embodiment, although the control mode of the amphibious vehicle is switched by the manual operation of the driver, the present invention is not limited to this. For example, it is possible to automatically switch the control mode by attaching a water pressure sensor to the amphibious vehicle and detecting the water pressure applied to the amphibious vehicle by using the water pressure sensor.

EXPLANATION OF THE REFERENCE NUMERALS

1 Engine
2 Power distribution device
3 Wheel transmission
4 Wheel
5 Propeller transmission
6 Propeller
10 Power transmission shaft
20 First power distribution shaft
21 Wheel shaft
30 Second power distribution shaft
31 Propeller shaft

The invention claimed is:

1. An amphibious vehicle, comprising:
a drive source configured to produce power;
a drive device for travel on land configured to be driven by the power produced in the power source;
a propulsion device for travel on water configured to be driven by the power produced in the power source;
a power distribution device configured to distribute the power produced by the power source to the drive device for travel on land and the propulsion device for travel on water,
the amphibious vehicle being configured to activate both of the drive device for travel on land and the propulsion device for travel on water in transition from water to land;
a first transmission between the power distribution device and the drive device for travel on land, the first transmission having a plurality of speed gears including a low-speed gear; and
a second transmission between the power distribution device and the propulsion device for travel on water, the second transmission having a plurality of speed gears including a low-speed gear, and
wherein in the transition from water to land, the first transmission is set to the low-speed gear, and the second transmission is set to the low-speed gear.

2. The amphibious vehicle according to claim 1, wherein each of the first and second transmissions has a clutch function.

* * * * *